United States Patent
Falciai et al.

(10) Patent No.: US 6,567,158 B1
(45) Date of Patent: May 20, 2003

(54) FIBER OPTIC SENSOR WITH PHOTOCHROMIC TRANSDUCER, AND CORRESPONDING METHOD

(75) Inventors: Riccardo Falciai, Florence (IT); Anna Grazia Mignani, Florence (IT); Cosimo Trono, Brindisi (IT)

(73) Assignee: Consiglio Nazionale Delle Ricerche (IT)

(*) Notice: Subject to any disclaimer, the term of this patent is extended or adjusted under 35 U.S.C. 154(b) by 0 days.

(21) Appl. No.: 09/869,788
(22) PCT Filed: Jan. 24, 2000
(86) PCT No.: PCT/IT00/00021
    § 371 (c)(1),
    (2), (4) Date: Jul. 3, 2001
(87) PCT Pub. No.: WO00/45139
    PCT Pub. Date: Aug. 3, 2000

(30) Foreign Application Priority Data

Jan. 26, 1999 (IT) ............................ FI99A0014

(51) Int. Cl.⁷ ........................................... G01J 3/00
(52) U.S. Cl. ................................................. 356/51
(58) Field of Search .......................... 250/227, 474; 385/123, 126; 356/432, 51, 213, 235; 430/326, 271, 233

(56) References Cited

U.S. PATENT DOCUMENTS

| | | | | |
|---|---|---|---|---|
| 4,113,353 A | * | 9/1978 | Matsushita | 250/227.31 |
| 4,942,113 A | * | 7/1990 | Trundle | 430/271.1 |
| 5,363,463 A | * | 11/1994 | Kleinerman | 250/227.11 |
| 5,387,798 A | * | 2/1995 | Funakoshi et al. | 250/474.1 |
| 5,581,090 A | * | 12/1996 | Goudjil | 250/474.1 |
| 5,614,990 A | * | 3/1997 | Bruce et al. | 355/71 |
| 5,991,479 A | * | 11/1999 | Kleinerman | 250/227.11 |

FOREIGN PATENT DOCUMENTS

| | | |
|---|---|---|
| JP | 60230104 | 11/1985 |
| JP | 05072134 | 3/1993 |
| JP | 06129901 | 5/1994 |
| JP | 6130546 | 5/1994 |
| JP | 08159868 | 6/1996 |

* cited by examiner

Primary Examiner—Thien M. Le
Assistant Examiner—Edwyn Labaze
(74) Attorney, Agent, or Firm—McGlew and Tuttle, P.C.

(57) ABSTRACT

A description is given of a sensor for measuring the UV fraction of a radiation, comprising a photochromic transducer consisting of a photochromic material (3) with characteristics of reversible photochromism, whose absorbance varies as a function of the UV fraction of the radiation (R) incident on the photochromic material. An optical path (7) is provided to guide a light signal through said photochromic material and collect a return light signal, whose value is proportional to the level of absorbance of the photochromic material.

20 Claims, 4 Drawing Sheets

FIBER OPTIC SENSOR WITH PHOTOCHROMIC TRANSDUCER, AND CORRESPONDING METHOD

FIELD OF THE INVENTION

The present invention relates to a sensor for determining the UV fraction of a radiation which strikes the sensor. In a further aspect, the invention relates to a sensor for determining the UV irradiance.

The invention also relates to a measuring device comprising an optical fiber sensor for determining the UV fraction and if necessary the UV irradiance, together with a corresponding method.

BACKGROUND OF THE INVENTION

All materials of organic origin are at risk if exposed to incorrect illumination, owing to the chemical reactions initiated by exposure to light. A typical reaction is photo-oxidation, in other words the formation of free radicals following the absorption of a photon by an organic molecule and the subsequent binding of the radical with an oxygen molecule. The peroxide radical formed in this way gives rise to a series of chemical reactions which lead to the progressive deterioration of the organic material. The damage caused to the organic material is cumulative and irreversible.

This problem is particularly serious in the field of the fine arts, since excessive illumination of the works displayed in museums, art galleries and other exhibition sites causes irreversible damage.

It has therefore been necessary to set limits of illumination in the museum environment, specified in precise standards. By way of example, the limits stipulated in the Italian UNI standards (CTI E02.01.304.0) are shown in the following table.

|  | Illuminance, lux | UV fraction, mW/lm | Annual light dose (Mlx*hr/yr) |
|---|---|---|---|
| Sensitive materials: textiles watercolors, objects made from paper and paper derivatives | 50 | 75 | 0.2 |
| Moderately sensitive materials: oil paintings, paintings on canvas, wooden objects | 150 | 75 | 0.5 |

The term illuminance (or illumination) denotes the luminous intensity of the light incident on a unit of surface area. This value is measured in lux (lx), and is equal to the luminous flux per unit of surface area: $lx = lm/m^2$, where lm (lumen) is the unit of measurement of the luminous flux. The intensity of the UV radiation incident on the unit of irradiated surface area (measured in $W/m^2$) is called the UV irradiance. The UV fraction is defined as the ratio between the UV irradiance and the illuminance and is measured in W/lm. This provides an indication of the quantity of UV radiation present in the total radiation incident on the unit of surface area.

SUMMARY OF THE INVENTION

The object of the present invention is to provide a sensor, a measuring device and a method of measurement for the determination of the UV fraction.

The object of an improved embodiment of the present invention is to provide a sensor which can also be used to measure the UV irradiance.

Essentially, the sensor according to the invention comprises a photochromic transducer consisting of a material with characteristics of reversible photochromism, for example a fulgide, whose absorbance varies as a function of the UV fraction of the radiation incident on the photochromic material, and at least a first optical path which guides a light signal through said photochromic material and collects a return light signal whose value is proportional to the level of absorbance of the photochromic material. The optical path preferably consists of an optical fiber or a bundle of optical fibers. The measurement may be made by reflection or by transparency. In the first case, the optical fibers for transmitting the radiation and for capturing the return signal are located on the same side of the photochromic material and associated with a diffusing or reflecting surface located on the opposite side. The possibility of positioning the outgoing and return fibers facing each other, with the photochromic material placed between them, is not excluded.

As will be explained below, the transducer assumes a coloration and consequently a level of absorbance which varies with the UV fraction of the radiation incident on it. It is therefore possible to interrogate the sensor by sending a light signal which passes through the fulgide and by capturing the attenuated signal, whose degree of attenuation provides a measurement of the UV fraction.

In an improved embodiment of the invention, the sensor may also comprise a further optical path for guiding toward the fulgide transducer a light radiation having characteristics such that a decoloration of the photochromic material is caused. The behavior of the fulgide material in the time interval following complete decoloration, under the effect of the external radiation incident on it, depends on the UV irradiance, in other words on the intensity of the ultraviolet radiation incident on it. It is therefore possible, by means of the same light signal used for the determination of the UV fraction, to determine the shape of the curve of attenuation with time and to derive the UV irradiance from this by the method described below.

With a sensor of this type it is therefore possible to implement a measurement method comprising the steps of: a) making the radiation to be measured strike a photochromic material, in other words a fulgide; b) making a light signal pass through the fulgide; c) determining the UV fraction of the radiation as a function of the attenuation of the light signal as it passes through the fulgide.

In its improved embodiment, the sensor according to the invention can be used to implement a method of measuring the UV irradiance, comprising the following steps: a) striking the fulgide transducer with a light beam having a wavelength such that it causes a decoloration of the fulgide, until its decoloraton is achieved; b) making a light signal pass through the fulgide while the latter is being struck by the radiation to be measured; c) detecting the variation with time of the attenuation of the light signal passing through the fulgide transducer, thus determining an attenuation curve; d) determining the UV irradiance of said radiation from the slope of the attenuation curve.

The various steps described above can be repeated at more or less regular intervals, to obtain a plurality of measurements over time and consequently the variation with time of the UV irradiance. When the fulgide transducer has reached the stable state, the UV fraction is determined by means of said transducer.

Further advantageous characteristics of the sensor and method according to the invention, and of the device which makes use of these, are indicated in the attached claims.

BRIEF DESCRIPTION OF THE DRAWINGS

The invention will be more clearly understood from the description and the attached drawing, which shows a practical example, without restriction, of the invention. In the drawing.

DESCRIPTION OF THE PREFERRED EMBODIMENT

Figure 1:
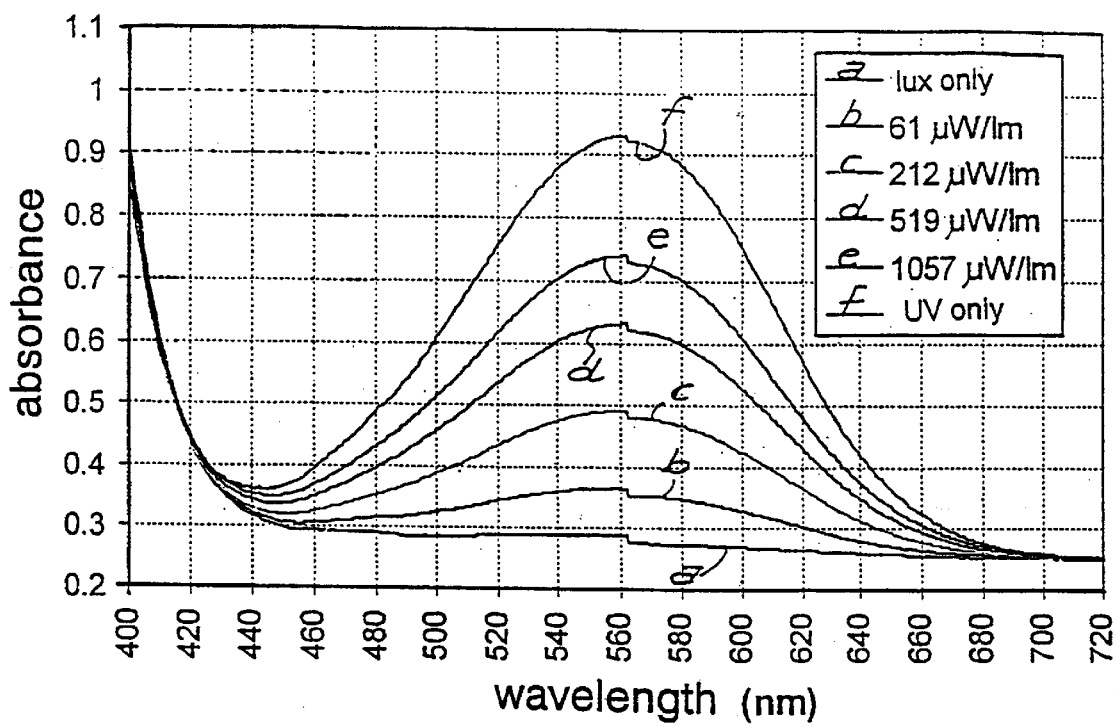
FIG. 1 shows the absorption spectra of a fulgide as a function of the wavelength and of the values of the UV fraction of the radiation incident on it.

The distinctive characteristic of fulgides is their completely reversible photochromism: when the fulgide is irradiated with ultraviolet radiation, it becomes colored, whereas when it is irradiated with light having a wavelength in the visible band, the material can be returned to the initial conditions (decoloraton).

At the molecular level, the absorption of a photon having the energy hv (where v is in the UV band) leads to a transformation of the fulgide molecule. The absorption of a photon having the energy hv' (where v' is in the visible band) can return this molecule to its initial form (reversibility of the phenomenon). If E is the molecule in the "noncolored" state, and C is the molecule in the "colored state", the reaction can be shown schematically as follows:

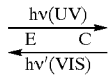

In the case of a system of E and C fulgide molecules irradiated simultaneously with visible and ultraviolet radiation, the system will tend to move toward a state of photostationary equilibrium in which the two reaction velocities, namely that of coloring and that of decoloring, are equal. In particular, if it is irradiated with constant quantities of UV and visible light, the system of fulgides will reach the asymptote or photostationary state according to the exponential equation of the type:

$$c(t) a \sin t' + A' \cdot e^{-B \cdot t} \quad (1)$$

where c(t) is the number of colored (type C) molecules. The photostationary state a sin t' depends on the antagonism of two physical parameters of ultraviolet radiation and visible light:

$$a \sin t' = D \cdot \frac{\Phi_{UV} \cdot \varepsilon_{EC}}{\Phi_{UV} \cdot \varepsilon_{EC} + \Phi_{VIS} \cdot \varepsilon_{CE}} \quad (2)$$

the time constant B depends on the simultaneous action of the two quantities:

$$B = \Phi_{UV} \cdot \varepsilon_{EC} + \Phi_{VIS} \cdot \varepsilon_{CE} \quad (3)$$

and the constant A' depends on the initial conditions:

$$A' = c(0) - a \sin t' \quad (4)$$

In (2) and (3), $\Phi_{UV}$ and $\Phi_{VIS}$ denote, respectively, the flux of photons of UV radiation and the flux of photons of visible light, and $\varepsilon_{EC}$ and $\varepsilon_{CE}$ denote, respectively, the probabilities of the coloring and decoloring reactions. Equation (2) is used for constructing the UV-fraction sensor. The constant D in Equation (2) is determined by assuming $\Phi_{VIS}=0$, in other words by irradiation with UV only, and is equal to the asymptote reached by the completely colored specimen;

$$D = a \sin t' UV \quad (5)$$

The quantity $\Phi_{UV} \varepsilon_{EC}$ is proportional to the UV irradiance, and $\Phi_{VIS} \varepsilon_{CE}$ is proportional to the illuminance. Therefore, according to (2) and the definition of the UV fraction, we obtain;

$$UV\ fraction = \frac{irradiance}{illuminance} \propto \frac{a \sin t'}{a \sin t' uv - a \sin t'} = \frac{F_{UV}\ \varepsilon_{EC}}{F_{VIS}\ \varepsilon_{EC}} \quad (6)$$

Therefore, the photostationary state a sin t', to which a set of fulgides irradiated with UV and visible light tends, is directly related to the UV fraction. It is not necessary to measure the UV irradiance and illuminance separately and find the ration of the two values.

Essentially, therefore, the irradiated fulgide has a variable coloration, and therefore a variable absorbance, according to the UV fraction of the radiation incidents of it. By way of example, FIG. 1 shows the absorption spectra found when a specimen of fulgides incorporated in a polymer matrix is irradiated with known UV fractions. As shown in FIG. 1, the photochromic material has an absorbance varying as a function of the UV fraction of the radiation incident on it. The variation of absorbance is significant for wavelengths from 480 to 640 nm, and particularly for wavelengths in the region of 540–570 nm.

Another equation which is useful for constructing a sensor capable of measuring UV irradiance is obtained from the following argument: if a specimen of fulgides which is completely decolored, in other words one in which only type E molecules are present, is irradiated with UV and visible light, the only possible reaction in the first instants of irradiation is the coloring reaction, and therefore the only physical parameter which generates modifications in the specimen is the UV irradiance, regardless of the quantity of visible light (filters for blocking the visible light are not required). This can be formulated in the following equation:

$$\frac{dc}{dt}(t = 0) \propto irradiance \quad (7)$$

As will be explained subsequently, it is possible to apply this equation to make use of the transient state of the fulgide, and particularly the coloring velocity, to determine the UV irradiance of the radiation incident on it.

Fulgides in a polymer matrix can be used as the transducer of an optical fiber sensor by inserting the matrix containing the fulgide material in the optical path of a light signal used to interrogate the sensor, this signal being guided by a system of optical fibers and suitably modulated in a known way. The attenuation of the signal, which is proportional to the absorbance of the fulgide material, is used to determine the UV fraction with which the fulgide is irradiated.

The quantity c(t) (Equation 1) is related to the attenuation of the light guided by the optical fibers according to the following equation (Lambert's and Beer's laws):

$$\ln\frac{I}{I_0} \propto -d \cdot c(t \tag{8}$$

where $I_0$ is the intensity passing through the fulgide material when c=0 (specimen decolored), I is the intensity at a generic instant, and d is the thickness of fulgide through which the beam has passed. If the fulgide material is irradiated with constant quantities of UV and visible light, then by combining Equations (1) and (8) the variation of the attenuation with time can be expressed by the following exponential equation;

$$\ln\left(\frac{I}{I_0}\right) = -asympt + A \cdot e^{-B+t} \tag{9}$$

Figure 2:
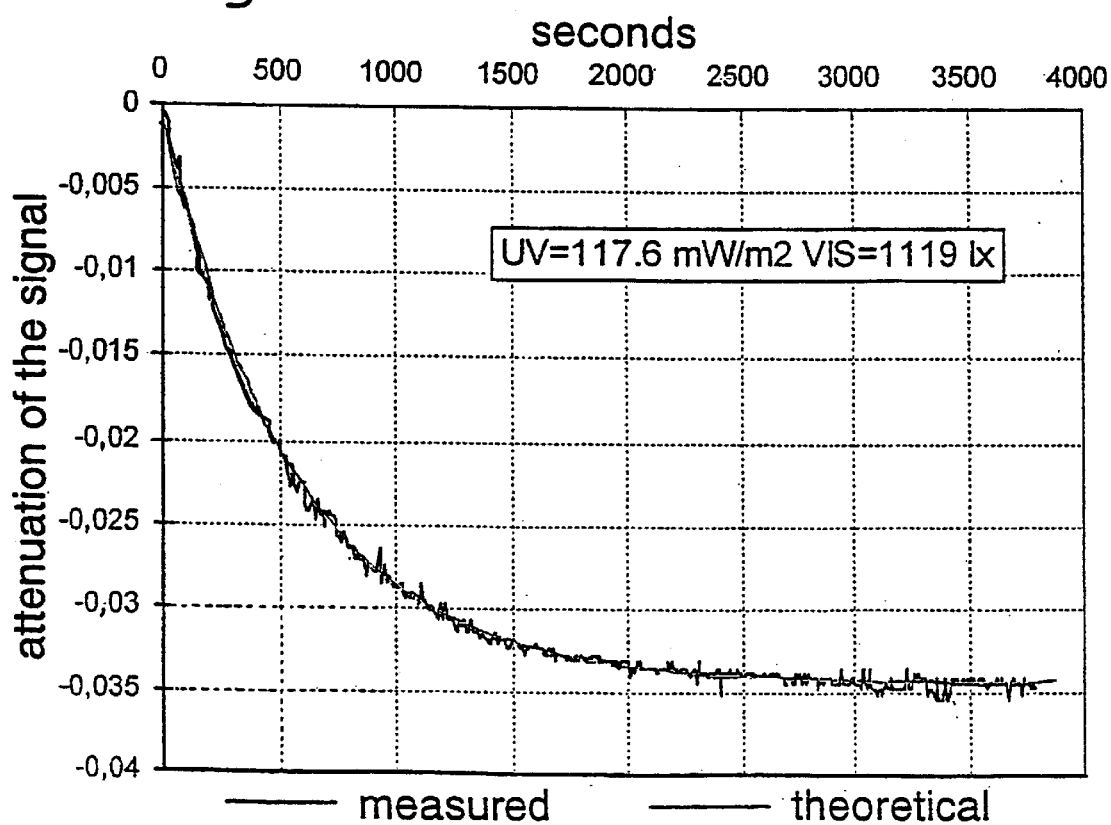
FIG. 2 shows an attenuation curve of the interrogation signal of the sensor according to the invention.

FIG. 2 shows an attenuation curve obtained by irradiating a specimen of fulgides with constant quantities of UV and visible light (UV=117.6 mW/m$^2$; VIS=1119 lux), with the theoretical curve according to Equation 9 superimposed on it.

The following equation can therefore be used to measure the UV fraction (a sin t is a measurable quantity);

$$UV\ fraction = \frac{irradiance}{illuminance} \propto \frac{asympt}{asympt_{UV} - asympt} \tag{10}$$

For measuring the UV irradiance, it is simply necessary to relate the slope of the attenuation curve (9), in the first instants of measurement following the complete decoloring of the specimen, to the UV irradiance $$irradiance \propto \frac{d\left[\ln\frac{I}{I_0}\right]}{dt}(t=0) \tag{11}$$

Construction of the Sensor

Figure 3:
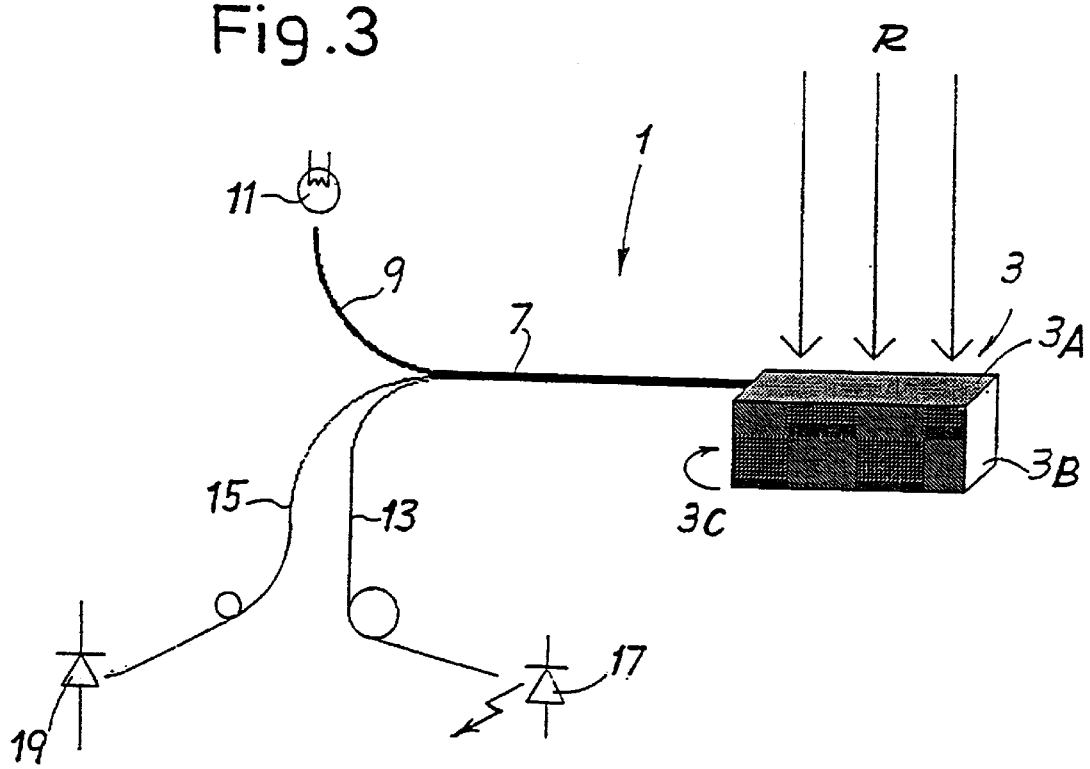
FIG. 3 shows a diagram of the sensor.

One embodiment of the sensor is shown in FIG. 3. The sensor is indicated in a general way by the number 1 and has a transducer 3 consisting of a block of parallelepipedal shape consisting of a polymer matrix containing the fulgide material, for example benzylidene succinic anhydride. The dimensions of the parallelepiped may be, for example, 2×2×5 mm. One of the lateral faces, indicated by 3A, of the block 3 is exposed to the ambient radiation RF whose characteristics are to be determined by means of the sensor.

A diffusing surface is applied to one of the bases 3B of the block 3, while a first end of a bundle of optical fibers, indicated by 7, is applied to the opposite base 3C. The end of the bundle of optical fibers 7 is applied adjacent to the lateral face 3A struck by the ambient radiation R, to increase the sensitivity of measurement, the exposed side being the area of the transducer 3 which is most exposed to the radiation R and which is therefore colored to the greatest extent. The bundle of optical fibers 7 consists of five fibers 9 connected to a light source, indicated schematically by 11, and consisting, for example, of a laser diode, whose emission wavelength is such that it causes the decoloration of the fulgide material incorporated in the transducer 3. The bundle 7 of fibers also comprises two optical fibers 13 and 15 of a measuring line. The optical fiber 13 carries a light radiation from a source 17, for example an LED which emits at 570 nm, or in any case at a wavelength at which the fulgide material used has an absorbance varying markedly as a function of the UV fraction of the ambient radiation R incident on it. The light beam guided by the input fiber 13 passes through the whole length of the transducer 3 and is diffused by the diffusing surface 3B. The optical fiber 15 receives at its input a fraction of the light diffused by the surface 3B and guides it to a photodetector, for example a phototransistor or a photodiode 19.

Figure 4:
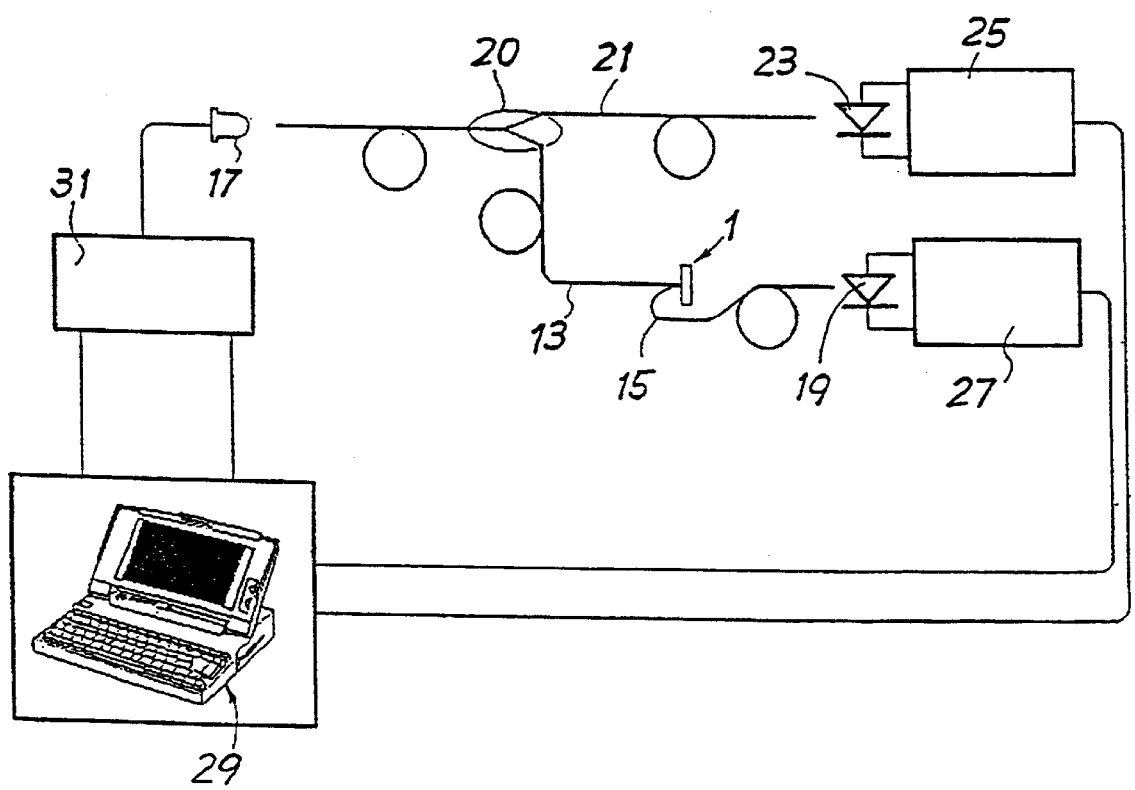
FIG. 4 shows a diagram of the measuring device using the sensor of FIG. 3.

The sensor 1 is inserted in a measuring device of the optical fiber type, which, in an experimental embodiment, has the layout shown in FIG. 4. The LED 17 emitting at 570 nm is housed in a casing to which the input fiber of a directional coupler 20 is connected. One of the two output fibers from the coupler 21 is used as the reference arm 21 for compensating any fluctuations of the source and is associated with a photodiode 23 interfaced with an amplification circuit 25. The other output optical fiber 13 from the coupler 20 forms part of the measuring arm which guides the interrogation light signal to the photochromic transducer 3 inserted in the sensor 1. The photodiode 17 which receives the light signal, which is attenuated after passing through the transducer of the sensor 1, is associated with an amplification circuit 27. The two amplification circuits 25, 27 are interfaced, through analog inputs and a DAP acquisition card, with an electronic computer 29. The computer 29 also provides an analog output for the drive current of the LED 17 and a digital output for modulating the LED, connected to an amplification and modulation circuit 31, which controls the LED 17 which emits the interrogation signal for the sensor 1. In the diagram in FIG. 4, the laser diode 11 is omitted.

To measure the UV fraction with the device of FIG. 4 and the sensor of FIG. 3, it is simply necessary to "measure" the color of the transducer 3 at a given instant: for this purpose, the transducer 3 is exposed to the radiation whose UV fraction is to be measured, and the attenuation of the signal guided by the optical fibers 13, 15 is measured with the apparatus shown in FIG. 4.

Calibration and Practical Tests

Figure 5:
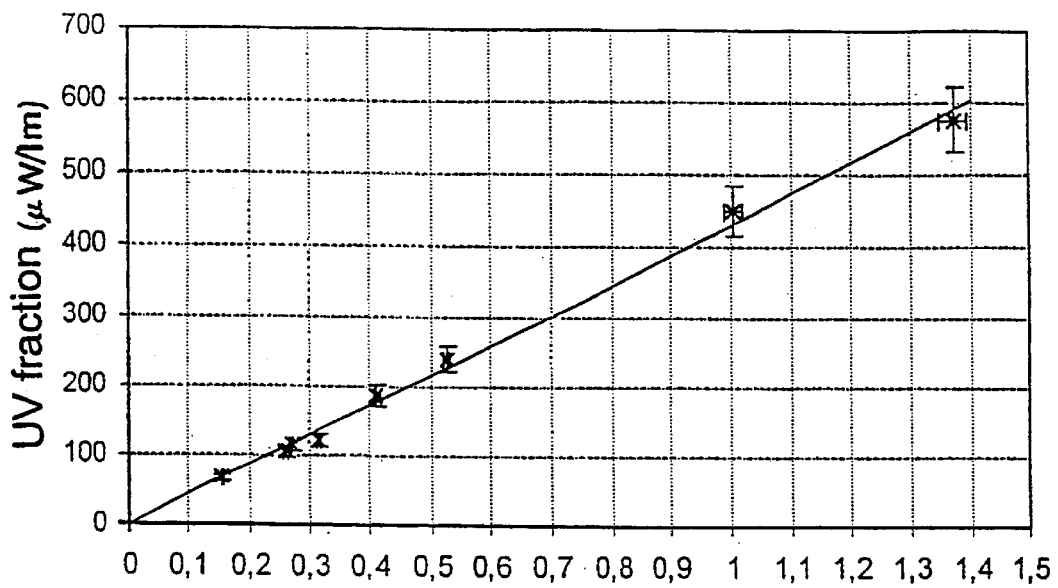
FIG. 5 shows the calibration curve of the sensor for measuring the UV fraction.

The sensor was calibrated in the laboratory by illuminating the transducer 3 with different values of the UV fraction, using a mercury lamp as the UV source and a tungsten lamp as the visible-light source. The response of the optical fiber sensor was compared with that of a commercially available reference sensor. The calibration graph is shown in FIG. 5.

Figure 6:
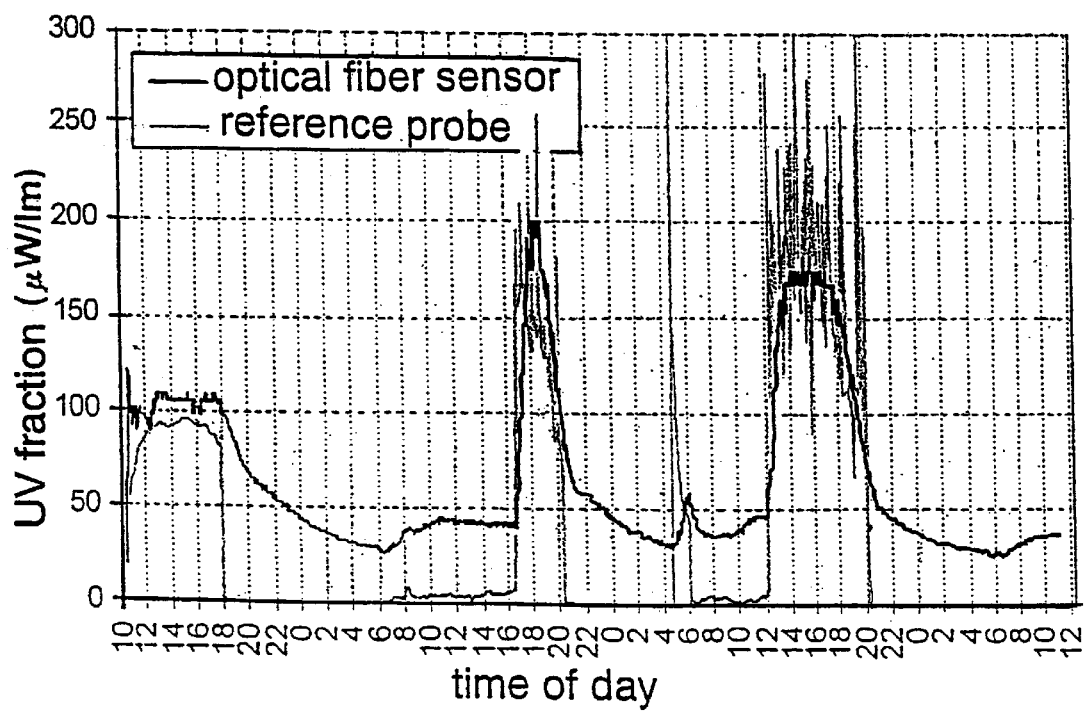
FIG. 6 shows a diagram comparing the response of the sensor according to the invention with that of a reference probe for measuring the UV fraction.

The operation of the sensor for measuring the UV fraction was tested in real operating conditions in the Pollaiolo Room at the Uffizi Gallery in Florence. The results are reproduced in FIG. 6, where the time is shown on the horizontal axis and the measured UV fraction (expressed in $\mu$W/lm) is shown on the vertical axis. The diagram shows the response of the sensor according to the invention in black, and the response of a reference probe of a commercial type in gray.

The sensor was placed in the proximity of a picture exposed to the light from the windows. The color of the fulgide transducer varies with the variations in illumination, and since the variations of the natural levels are sufficiently slow, the fulgide transducer can be considered to be in the photostationary state in each successive instant.

The agreement between the responses of the sensor according to the invention and of the reference probe is high at times when the venetian blinds which partially obscure the windows are open. Additionally, the commercial reference probe shows a greater response to the effects of disturbance caused by the passage of visitors in front of the measurement point, while the sensor according to the present invention provides a more accurate result, since it is not affected by these disturbance factors.

The following procedure was devised for measuring the UV irradiance by using Equation (11): starting with the decolored fulgide specimen, this is exposed to the ambient radiation for a sufficient time to determine the slope of the absorbance curve of the fulgide specimen. In this stage of coloring, the attenuation of the signal is measured by means of the two outward and return optical fibers 13, 15.

The transducer 3 is then illuminated with visible light, emitted by the laser diode 11 and guided by means of the optical fibers 9 to the transducer, for a time sufficient for the decoloring of the fulgide material forming the transducer. The light emitted by the laser diode 11 is sufficient to return the transducer 3 to the completely decolored state, so that the system is ready for a new measurement of the slope of the attenuation curve. The optimal times for the two stages were found to be as follows: 2 minutes for the decoloring; 3 minutes for the measurement of the slope. Thus the apparatus can capture one data element every 5 minutes.

Figure 7:
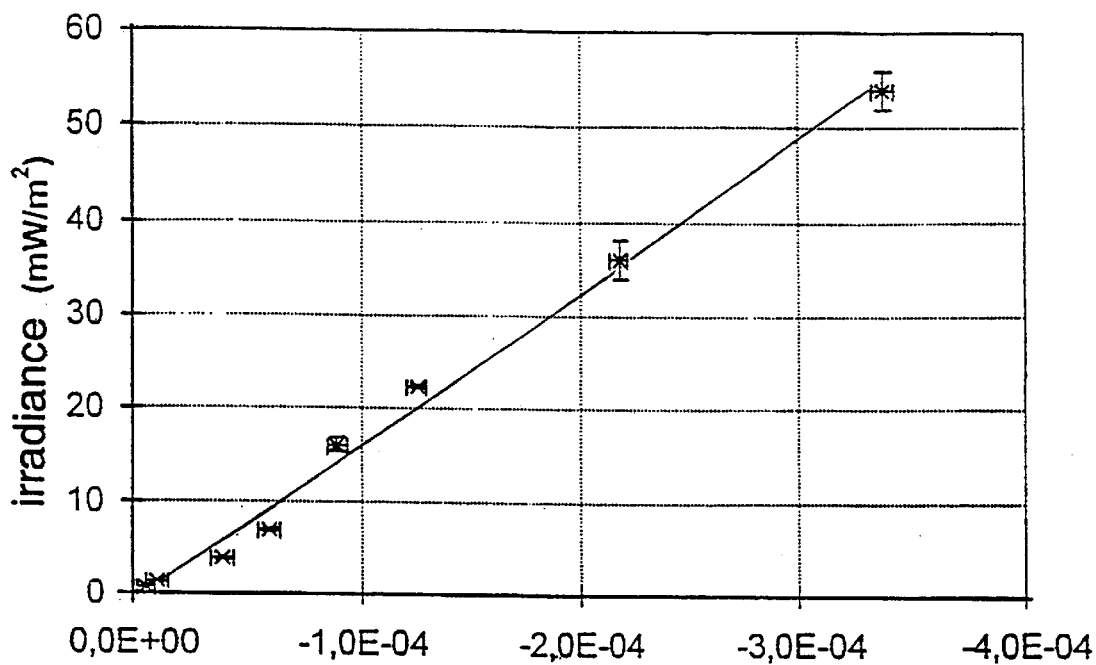
FIG. 7 shows the calibration curve of the sensor for measuring the UV irradiance.

The results of the calibration of the probe carried out in the laboratory by illumination with the mercury lamp are shown in FIG. 7.

Figure 8:
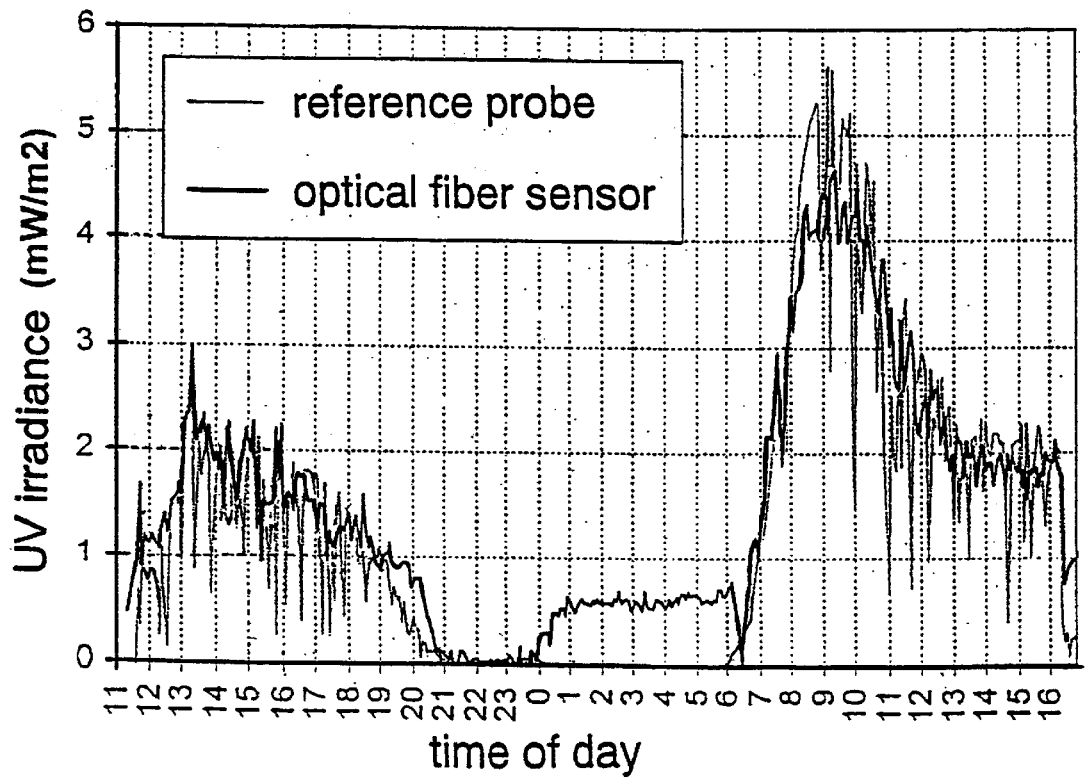
FIG. 8 shows a diagram comparing the response of the sensor according to the invention with that of a reference probe for measuring the UV irradiance.

The test in real conditions, the results of which are shown in FIG. 8, was carried out in the Pollaiolo Room. The black curve shows the response of the fulgide sensor, while the gray curve represents the response of the reference probe. In this case also, the response of the optical fiber sensor matches the response of the commercial reference probe, and is less affected by the passage of visitors than that of the reference probe.

It is to be understood that the drawing shows only one embodiment of the invention, which can be varied in its forms and arrangements without departure from the scope of the guiding principle of the invention.

What is claimed is:

1. A device for measuring the ratio between the UV irradiance and the illuminance, of an incident radiation, comprising:
    a sensor including a photochromic transducer including a material with characteristics of reversible photochromism, and at least a first optical path for guiding a light signal towards and through said photochromic material and collecting a light output signal whose value decreases when the level of absorbance of the photochromic material increases, the level of absorbance of the photocromic material depending upon said ratio of the radiation incident on said sensor;
    a first source of light radiation associated with said first optical path for generating said light signal and injecting it into said first optical path;
    a detector for detecting the light signal returning from said first optical path; wherein said ratio is determined by measuring the attenuation of said light signal passing through said photochromic material.

2. The device as claimed in claim 1, comprising: a second source of light radiation in the visible range, associated with a further optical path for causing the decoloration of the photochromic material; and a sensor control and interrogation system which causes a periodic decoloration of the photochromic material and a subsequent measurement of the UV irradiance by the determination of the slope of the attenuation curve of the return signal from said sensor in a time interval following said decoloration.

3. The device as claimed in claim 2 at least, in which said further optical path comprises a bundle of optical fibers which, in the proximity of said first face, is joined to said at least one optical fiber of the first optical path.

4. The device as claimed in claim 1, in which the first optical path includes one or more optical fibers, one end of which is applied to a first face of a block comprising the photochromic material, a reflecting or diffusing surface being applied to a second face of said block opposite said first face.

5. The device as claimed in claim 4, in which said block has a third face exposed to the radiation to be analyzed.

6. The device as claimed in claim 5, in which the end of said one or more optical fibers is applied to said first face in a position adjacent to said third face.

7. The device as claimed in claim 4 at least, in which said first optical path comprises a first optical fiber for guiding the light signal toward the photochromic material and a second optical fiber for collecting the output signal.

8. The device as claimed claim 1, in which said photochromic material is a fulgide dispersed in a polymer matrix.

9. The device as claimed in claim 8, in which said fulgide is benzylidene succinic anhydride.

10. The device as claimed in claim 1, in which said first light source emits a radiation with a wavelength in the range from 520 to 620 nm, and preferably equal to approximately 570 nm.

11. The device as claimed in claim 1, comprising a reference optical path with means for detecting the light signal emitted by said first source and a system for compensating the fluctuations of the light intensity of the signal emitted by said first source.

12. A method for measuring the ratio between the UV irradiance and the illuminance of a radiation, comprising the steps of:
    striking with said radiation a photochromic material having characteristics of reversible photochromism, whose absorbance varies as a function of said ratio;
    making a light signal pass through said photochromic material;
    determining said ratio by measuring the attenuation of said light signal passing through said photochromic material.

13. A method for measuring an UV irradiance of a radiation, comprising the steps of:
    a) striking a photochromic material having characteristics of reversible photochromism, whose absorbance varies as a function of the ratio between said UV irradiance and an illuminance of said radiation, with a light beam having a wavelength such that it causes the decoloration of the photochromic material, until the decoloration of the photochromic material is achieved;
    b) making a light signal pass through said photochromic material while the latter is being struck by said radiation;
    c) detecting the variation with time of the attenuation of the light signal passing through said material, thus determining an attenuation curve;
    d) determining the UV irradiance of said radiation from the slope of the attenuation curve;
    e) repeating stages (a) (d) at intervals of time if necessary.

14. The method as claimed in claim 12 or 13, in which the light signal has a wavelength in the range from 520 to 620 nm and preferably equal to approximately 570 nm.

15. A method for determining a ratio of UV radiation to illuminance for incident radiation, the method comprising the steps of:

provide photochromic material with a optical path, said photochromic material having an absorbent coefficient absorbing a light signal passing through said optical path, said absorbent coefficient being variable as a function of the UV radiation in the incident radiation;

exposing said photochromic material to the incident radiation;

transmitting the light signal through said optical path;

measuring a value of the light signal after the light signal has passed through said optical path;

calculating the ratio as a function of the measured value of the light signal.

16. A method in accordance with claim 15, wherein:

a reference value of the light signal is determined before the light signal passes through said optical path; and said calculating of the ratio includes using said reference value.

17. A method in accordance with claim 15, further comprising:

irradiating said photochromic material with a light to lower said absorbent coefficient of said photochromic material, stopping said irradiating after said absorbent coefficient has been lowered; and measuring the value of the light signal at a plurality of time points after said stopping;

using the value of the light signal at the plurality of time points in said calculating of the ratio.

18. A method in accordance with claim 17, further comprising:

determining an attenuation of the value of the light signal at the plurality of time points; and using the attenuation in said calculating of the ratio.

19. A method as claimed in claim 15, wherein the light signal has a wavelength in the range of 520 to 620 nm.

20. A method in accordance with claim 15, wherein:

said photochromic material is a fulgide dispersed in a polymer matrix.

* * * * *